United States Patent
Kurian

(10) Patent No.: US 10,454,892 B2
(45) Date of Patent: Oct. 22, 2019

(54) DETERMINING SECURITY FEATURES FOR EXTERNAL QUANTUM-LEVEL COMPUTING PROCESSING

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 362 days.

(21) Appl. No.: 15/437,904

(22) Filed: Feb. 21, 2017

(65) Prior Publication Data

US 2018/0239928 A1 Aug. 23, 2018

(51) Int. Cl.
H04L 29/06 (2006.01)
G06F 21/62 (2013.01)

(52) U.S. Cl.
CPC ...... *H04L 63/0209* (2013.01); *G06F 21/6263* (2013.01); *H04L 63/10* (2013.01)

(58) Field of Classification Search
CPC .. H04L 63/0209; H04L 63/10; G06F 21/6263
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |
| 7,533,068 B2 | 5/2009 | Maassen van den Brink et al. | |
| 7,619,437 B2 | 11/2009 | Thom et al. | |
| 7,639,035 B2 | 12/2009 | Berkley | |
| 7,864,958 B2 | 1/2011 | Harrison et al. | |
| 7,898,282 B2 | 3/2011 | Harris et al. | |
| 8,008,942 B2 | 8/2011 | van den Brink et al. | |
| 8,190,548 B2 | 5/2012 | Choi | |
| 8,195,596 B2 | 6/2012 | Rose et al. | |
| 8,283,943 B2 | 10/2012 | van den Brink et al. | |
| 8,421,053 B2 | 4/2013 | Bunyk et al. | |
| 8,488,790 B2 | 7/2013 | Wellbrock et al. | |
| 8,744,075 B2 | 6/2014 | Tanaka | |
| 8,897,449 B1 * | 11/2014 | Broadbent | H04L 9/0891 380/277 |
| 9,207,672 B2 | 12/2015 | Williams et al. | |
| 9,246,675 B2 | 1/2016 | Ding | |
| 9,292,700 B2 * | 3/2016 | Parker | G06F 21/606 |
| 9,400,499 B2 | 7/2016 | Williams et al. | |
| 9,537,660 B2 | 1/2017 | Wang et al. | |

(Continued)

FOREIGN PATENT DOCUMENTS

AU 2010249233 A1 6/2011
CA 2886849 A1 10/2016

(Continued)

*Primary Examiner* — Nelson S. Giddins
(74) *Attorney, Agent, or Firm* — Michael A. Springs; Moore & Van Allen PLLC; James C. Edwards

(57) ABSTRACT

Systems and method for determining and applying security measures, such as segmentation, obfuscation and/or insertion of dummy data, to data sets determined to require external quantum-level computing processing. In those embodiments in which the data set is segmented, external quantum-level computing processing entities are determined, such that each segment is communicated to a different external entity for subsequent quantum-level computing processing.

19 Claims, 7 Drawing Sheets

(56) References Cited

U.S. PATENT DOCUMENTS

| | | |
|---|---|---|
| 2002/0199108 A1 | 12/2002 | Chuang et al. |
| 2003/0112970 A1 | 6/2003 | Mitra |
| 2003/0149869 A1* | 8/2003 | Gleichauf ............... H04L 45/50 |
| | | 713/153 |
| 2004/0139000 A1 | 7/2004 | Amos |
| 2005/0010508 A1 | 1/2005 | Groz |
| 2005/0078826 A1 | 4/2005 | Takeuchi |
| 2005/0259825 A1 | 11/2005 | Trifonov |
| 2006/0088157 A1 | 4/2006 | Fujii |
| 2006/0251247 A1 | 11/2006 | Akiyama et al. |
| 2007/0076884 A1 | 4/2007 | Wellbrock et al. |
| 2007/0192598 A1 | 8/2007 | Troxel et al. |
| 2007/0234051 A1* | 10/2007 | Akutsu ..................... H04L 9/12 |
| | | 713/168 |
| 2009/0106551 A1 | 4/2009 | Boren et al. |
| 2009/0106553 A1* | 4/2009 | Wang ....................... A63B 7/00 |
| | | 713/168 |
| 2009/0175452 A1 | 7/2009 | Gelfond et al. |
| 2010/0226659 A1 | 9/2010 | Nishioka et al. |
| 2010/0250497 A1* | 9/2010 | Redlich ................... F41H 13/00 |
| | | 707/661 |
| 2010/0299517 A1* | 11/2010 | Jukic .................. H04L 12/2809 |
| | | 713/150 |
| 2010/0299526 A1 | 11/2010 | Wiseman et al. |
| 2010/0329459 A1 | 12/2010 | Wiseman et al. |
| 2011/0085666 A1 | 4/2011 | Hicks |
| 2011/0213979 A1 | 9/2011 | Wiseman et al. |
| 2011/0317836 A1 | 12/2011 | Yeh et al. |
| 2012/0002008 A1 | 1/2012 | Valin et al. |
| 2012/0082312 A1 | 4/2012 | Liu et al. |
| 2012/0177200 A1* | 7/2012 | Harrison ................. H04B 10/70 |
| | | 380/278 |
| 2013/0016835 A1 | 1/2013 | Zbinden et al. |
| 2013/0081099 A1* | 3/2013 | Sathish ............... G06F 21/6245 |
| | | 726/1 |
| 2013/0083926 A1 | 4/2013 | Hughes et al. |
| 2013/0101119 A1 | 4/2013 | Nordholt et al. |
| 2013/0117200 A1 | 5/2013 | Thom |
| 2013/0138693 A1* | 5/2013 | Sathish ................. G06F 16/435 |
| | | 707/784 |
| 2013/0208894 A1 | 8/2013 | Bovino |
| 2013/0251145 A1* | 9/2013 | Lowans ................. H04L 9/0838 |
| | | 380/44 |
| 2013/0254900 A1* | 9/2013 | Sathish ................. H04W 4/185 |
| | | 726/28 |
| 2013/0315395 A1* | 11/2013 | Jacobs .................. H04L 9/0852 |
| | | 380/278 |
| 2014/0205089 A1 | 7/2014 | Irwin |
| 2015/0149787 A1 | 5/2015 | Panchapakesan et al. |
| 2015/0294118 A1* | 10/2015 | Parker ................... G06F 21/606 |
| | | 726/26 |
| 2016/0105439 A1 | 4/2016 | Hunt et al. |
| 2016/0219024 A1* | 7/2016 | Verzun .................. H04L 63/102 |
| 2016/0226846 A1 | 8/2016 | Fu et al. |
| 2016/0241396 A1 | 8/2016 | Fu et al. |
| 2016/0277183 A1* | 9/2016 | Murakami ........... H04L 9/0858 |
| 2017/0124348 A1 | 5/2017 | Pourzandi et al. |
| 2017/0346627 A1* | 11/2017 | Alleaume ............ H04L 9/0844 |
| 2018/0007108 A1 | 1/2018 | Karkkainen .......... H04L 65/607 |
| 2018/0109378 A1 | 4/2018 | Fu |
| 2018/0309785 A1 | 10/2018 | Kurian |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

DETERMINING SECURITY FEATURES FOR EXTERNAL QUANTUM-LEVEL COMPUTING PROCESSING

FIELD OF THE INVENTION

The present invention related to data security and, more specifically, determining security features for a data set that requires external quantum-level processing.

BACKGROUND

Quantum computing involves theoretical computation systems that make direct use of quantum-mechanical phenomena, such as superposition and entanglement, to perform operations on data. Whereas common digital computing requires that the data be encoded into binary digits (i.e., bits), each of which is always in one of two definite states (0 or 1), quantum computation uses quantum bits, which can be in superpositions of states.

While quantum computing is a burgeoning technology, its use is foreseen to grow in the near future as a means of solving complex problems more efficiently. However, technical challenges exist in building large-scale quantum computers and, as such, quantum-capabilities are limited. Thus, in the event that an entity, such as an enterprise, corporation, university or the like has a need or will have a need in the future to implement quantum-level computing, the entity is likely to rely on third-party entities (i.e., entities external from the enterprise, corporation, university or the like) to conduct such processing of data.

However, in today's computing environment in which data is entrusted in other entities, data breaches occur at an alarming rate. A data breach is a security incident in which data, typically sensitive, protected confidential data is copied, viewed, misappropriated or otherwise used by individuals/entities other than those authorized to do so. The breaching of data may be part of multiple entities acting together (e.g., collusion or conspiracy) or implicate governments or the like (e.g., espionage). Such data breaches may be intentional (i.e., perpetuated by wrongdoers) or unintentional, but in either instance, once the data has been comprised, the harm to the data owner is unavoidable. In this regard, when an entity provides data to a third-party/external entity, the entity runs the risk that the data may be breached.

Therefore, a need exists on the behalf of entities who desire to have third party/external entities perform quantum-level processing of the entity's data to limit the risk related to the possibility of the data being breached/comprised. In this regard, the desired systems, methods, and the like should lessen, if not eliminate, the risk to the data owner in the event that the data is breached/comprised by the third party/external entity. Moreover, desired systems, methods and the like should apply requisite security features to the data sets that require external quantum-level processing that are consistent with the confidentiality of the data set and take into account time constraints associated with the processing of the data.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for applying security measures to data sets requiring external/third-party quantum-level processing. By providing such security measures to the data sets prior to communicating/transferring the data to the external/third-party data processors, the present invention limits the risk associated with the data being breached/comprised, either intentionally or unintentionally, by the external/third-party entity.

In specific embodiments of the invention, the data set is segmented into discrete data blocks and each individual data block is communicated/transferred to a different external/third-party entity for subsequent quantum-level data processing. As a result, none of the external/third-party entities have access to the entire data set and, as such, in the event that the data possessed by an external/third-party entity is breached/comprised, the risk posed to the data owner is minimized because the breached/comprised data is only a segment/portion of the entire data set and, as such, may be have limited value in the hands of a wrongdoer.

In other embodiments of the invention, the data set and/or the data blocks are obfuscated, such that asymmetrical cryptography or the like is implemented to re-arrange, shift or the like the data elements in the data set and/or data blocks prior to communicating the data sets/segments to the external/third-party entities for quantum-level processing. Once the data set/data blocks have been quantum-level processed and returned to the data owner, the obfuscation is removed/reversed from the data set/data block.

In still further embodiments of the invention, the data set and/or data blocks may be injected with "dummy" data (i.e., benign information that does not contain any useful data, but serves to reserve space where real data is nominally present). Insertion of dummy data further prevents breached data from being read/used by a wrongdoer. In specific embodiments of the invention the "dummy" data may be logically programmed (i.e., so-called smart "dummy" data) so that the data owner can forensically discern whether the dummy data has been accessed, read or otherwise manipulated.

In additional embodiments of the invention, the various functions of the system are segregated in individual trusted zones, such that processing may occur in a trusted zone absent knowledge of rules that being applied to the processing and/or upstream/downstream processing parameters. For example, data set segmentation, data set re-formation, the rules associated with data segmentation and re-formation and, in some embodiments, the communication/transfer of data sets are segregated in separate trusted zones. In this regard the trusted zones allow for segmentation and reformation rules to be applied without the corresponding segmentation and reformation algorithm being aware of which segmentation/reformation rules are being applied. Additionally, in those embodiments in which the communication/transfer occurs within a separate trusted zone, the data segmentation and re-formation may occur absent knowledge as to which external/third-party entity processed a data segment.

A system for determining security measures for a data set requiring quantum-level computing defines first embodiments of the invention. The system includes a distributed computing network configured to communicate data amongst a plurality of computing devices and one or more external entities, each entity controlling one or more of the plurality of computing devices configured for quantum level-computing processing. The system additionally includes a computer platform including a memory and one or more processors in communication with the memory. In addition, the system includes a data set security measure determining module stored in the memory, executable by the one or more processors and configured to receive the data set determined to require quantum-level computing and determine one or more security measures to apply to the data set based at least on a level of confidentiality associated with data in the data set and timing requirements associated with processing the data set. Additionally, the system includes a plurality of security measure modules stored in the memory, executable by the one or more processors and configured to apply security measures to the data set as determined by the data set security measure determining module. In addition, the system includes a data communication module stored in the memory executable by the processor and configured to initiate communication of at least a portion of the data set to one or more external quantum-level processing entities. The external entities are configured to process the data block via the corresponding one or more of the computing devices configured for quantum-level computing processing. Moreover, the system includes a security measure removal module stored in the memory, executable by the one or more processors and configured to, in response to receiving the quantum-level processed data from the one or more external quantum-level processing entities, remove the one or more security measures from the data set.

In specific embodiments of the system, the data communication module further comprises an external entity selection sub-module configured to select one of the external entities for quantum-level computing processing of the data set based on predetermined external entity selection rules, wherein the predetermined external entity selection rules are based on one or more of type of data in the data block, external entity quantum-level computing processing capabilities and external entity security capabilities.

In still further specific embodiments the system includes a data processing level-determining module stored in the memory, executable by the processor and configured to determine that the data set requires quantum-level computing.

In additional specific embodiments of the system, the plurality of security measure modules include a data segmentation module configured to segment the data set into a plurality of data blocks based on predetermined data segmentation rules. In specific embodiments of the system, the data segmentation module is further configured to segment the data set into the plurality of data blocks by at least one of randomly determining which data elements to include in the data blocks and systematically determining which data elements to include in the data blocks based on predetermined tiering criteria. In such embodiments of the system, the data segmentation rules are further configured to determine at least one of a size of each data block, and a sequence for the plurality of data blocks and/or tiering criteria. In further related embodiments of the system, the data communication module further comprises an external entity selection sub-module configured to select, for each data block, one of the external entities for quantum-level computing processing. In other related embodiments of the system, the a security measure removal module is further configured to receive the quantum-level computing processed data blocks from the different external entities and combine the quantum-level computing processed data blocks to re-form the data set be applying re-formation rules.

In still related specific embodiments of the system, the data segmentation rules and data re-formation rules are stored in a first trusted computing zone, the data segmentation module is stored in a second trusted computing zone and the security measure removal module is stored in a third trusted computing zone.

In other specific embodiments of the system, the plurality of security measure modules include a data obfuscation module configured to perform at least one of rearranging or shifting data elements in the data set.

While in still further specific embodiments of the system, the plurality of security measure modules include a dummy data module configured to generate dummy data and insert the dummy data into the data set. In related embodiments of the system, the dummy data module is further configured to generate the dummy data as logically programmed dummy data configured to record information associated with accessing the dummy data or attempting to access the dummy data.

In other specific embodiments the system includes a forensic analysis module stored in the memory, executable by the processor and configured to analyze the received quantum-level computing processed data blocks to determine whether the data blocks have been accessed or read in an unauthorized manner.

A method for external processing of a data set requiring quantum-level computing defines second embodiments of the invention. The method includes receiving the data set requiring quantum-level computing processing and determining one or more security measures to apply to the data set based at least on a level of confidentiality associated with data in the data set and timing requirements associated with processing the data set. The method further includes applying, by a computing device processor, the one or more security measures to the data set and, in response to applying the one or more security measures to the data set, electronically communicating at least a portion of the data set to one or more external quantum-level processing entities. In addition, the method includes, in response to receiving the quantum-level processed data from the one or more external quantum-level processing entities, removing the one or more security measures from the data set.

In specific embodiments of the method, determining one or more security measures further includes determining a segmentation scheme for segmenting the data set into a plurality of data blocks. The segmentation scheme comprises size of data blocks and sequencing of data blocks. In related embodiments the method may further include determining an external entity capable of quantum-level computing processing for each of the data blocks. The determination is based at least one or more of type of data in the data block, external entity quantum-level computing processing capabilities and external entity security capabilities.

In other specific embodiments of the method, determining one or more security measures further includes determining, based on obfuscation rules, an obfuscation scheme for rearranging or shifting the data in the data set.

In still further specific embodiments of the method, determining one or more security measures further includes determining a dummy data insertion scheme for inserting dummy data into the data set.

A computer program product including a non-transitory computer-readable medium defines third embodiments of the invention. The computer-readable medium includes a first set of codes for causing a computer to receive a data set requiring quantum-level computing processing and a second set of codes for causing a computer to determine one or more security measures to apply to the data set based at least on a level of confidentiality associated with data in the data set and timing requirements associated with processing the data set. The computer-readable medium additionally includes a third set of codes for causing a computer to apply the one or more security measures to the data set and a fourth set of codes for causing a computer to, in response to applying the one or more security measures to the data set, electronically communicate at least a portion of the data set to one or more external quantum-level processing entities. Moreover, the computer-readable medium includes a fifth set of codes for causing a computer to, in response to receiving the quantum-level processed data from the one or more external quantum-level processing entities, remove the one or more security measures from the data set.

In specific embodiments of the computer program product, the second set of codes is further configured to cause the computer to determine the one or more security measures, wherein the one or more security measures include (i) segmenting the data set into data blocks, (ii) obfuscating the data to rearrange or shift data elements within the data set or the data blocks, and (iii) generating and inserting dummy data within the data set or the data blocks.

Thus, systems, apparatus, methods, and computer program products herein described in detail below provide for determining and applying security measures, such as segmentation, obfuscation and/or insertion of dummy data, to data sets determined to require external quantum-level computing processing. The security measures herein described and implemented lessens the risk associated with the data being breached/comprised at the external entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
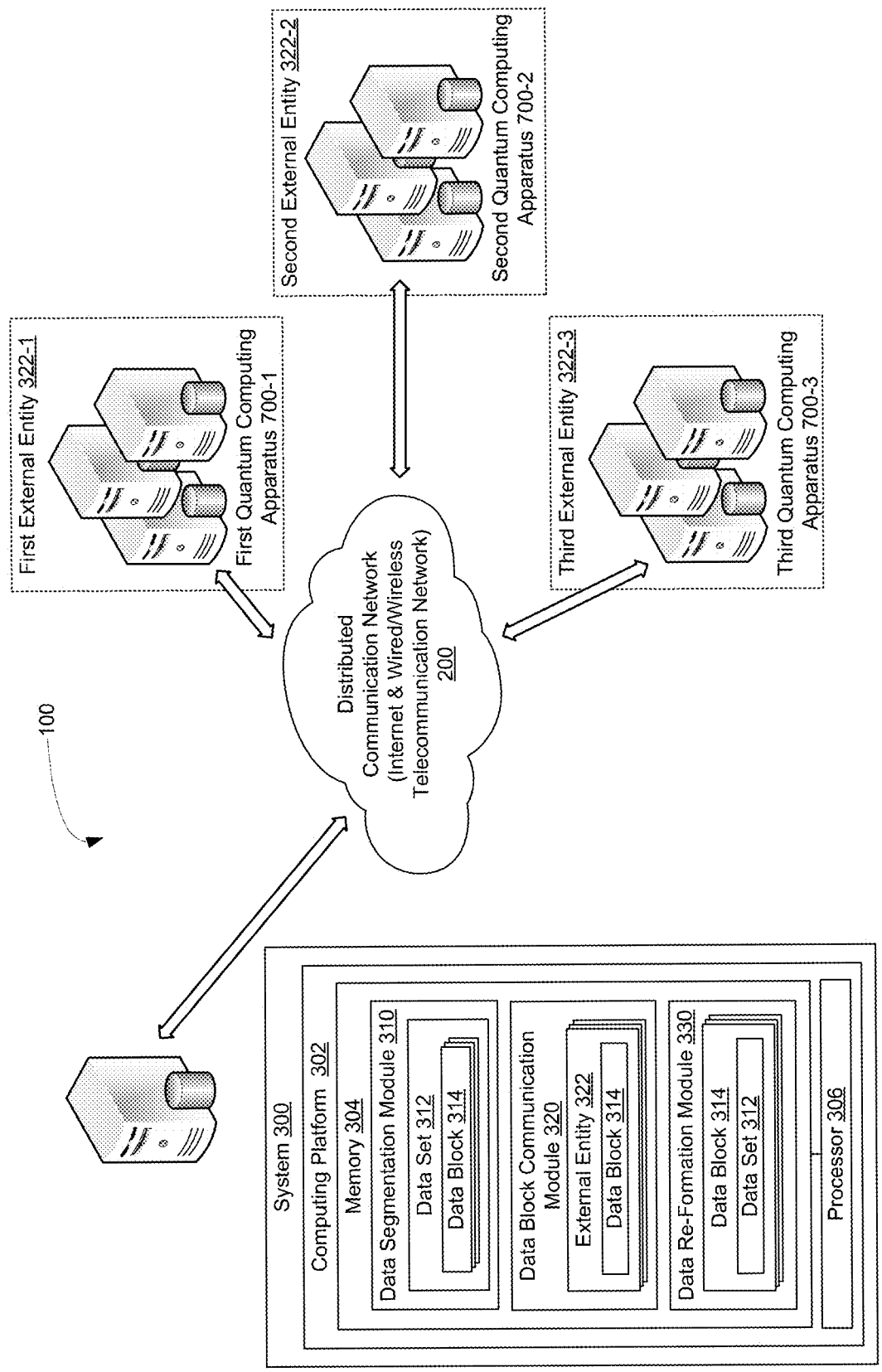
Figure 2:
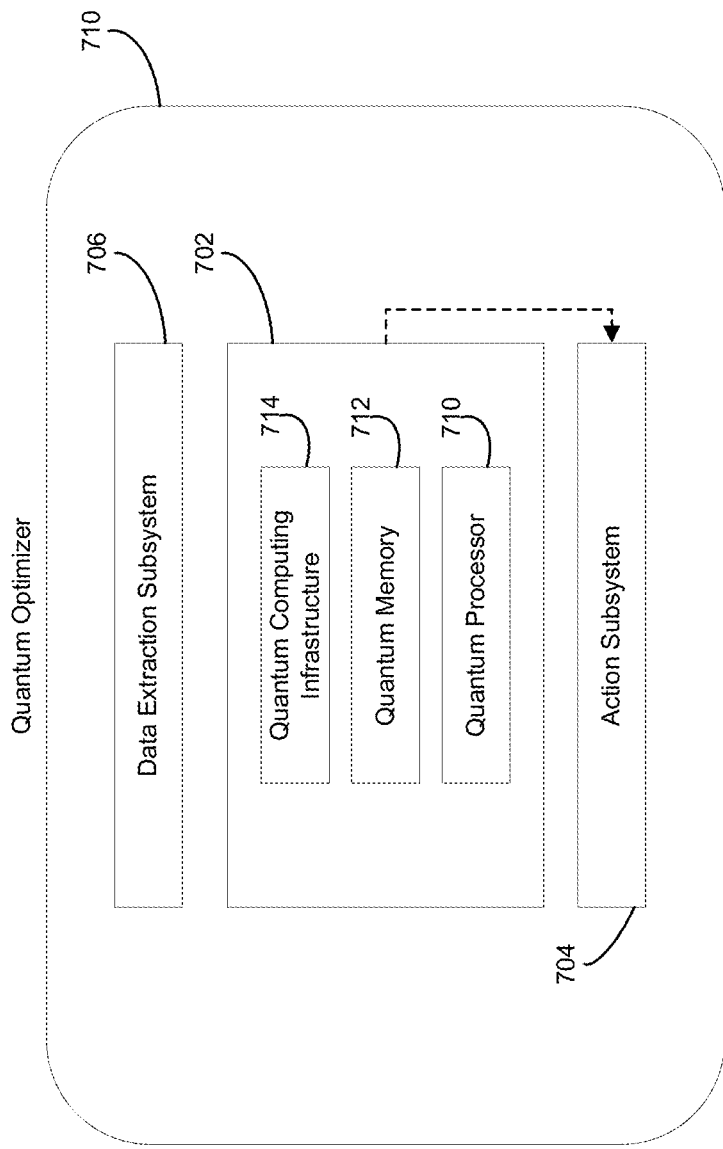
Figure 3:
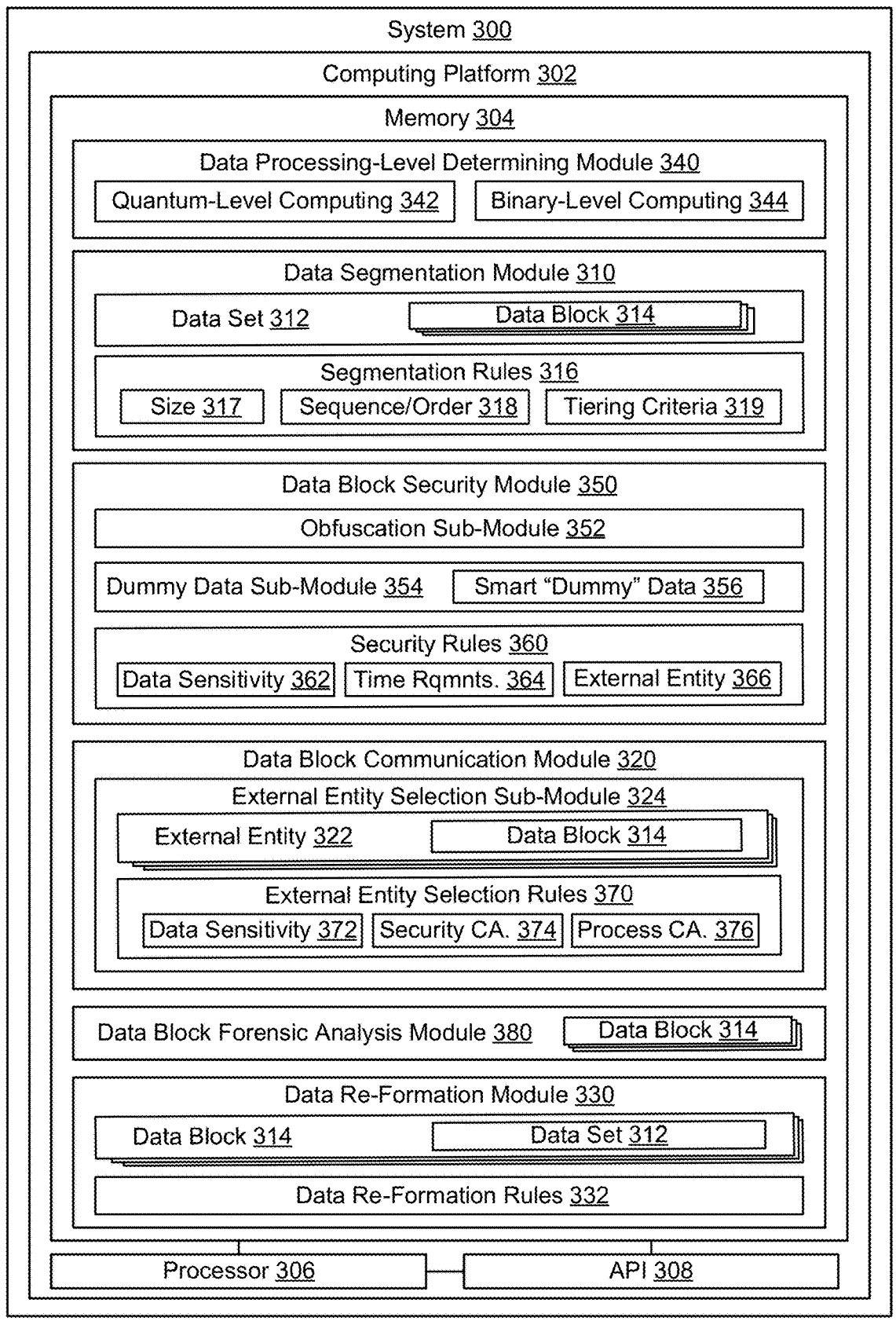
Figure 4:
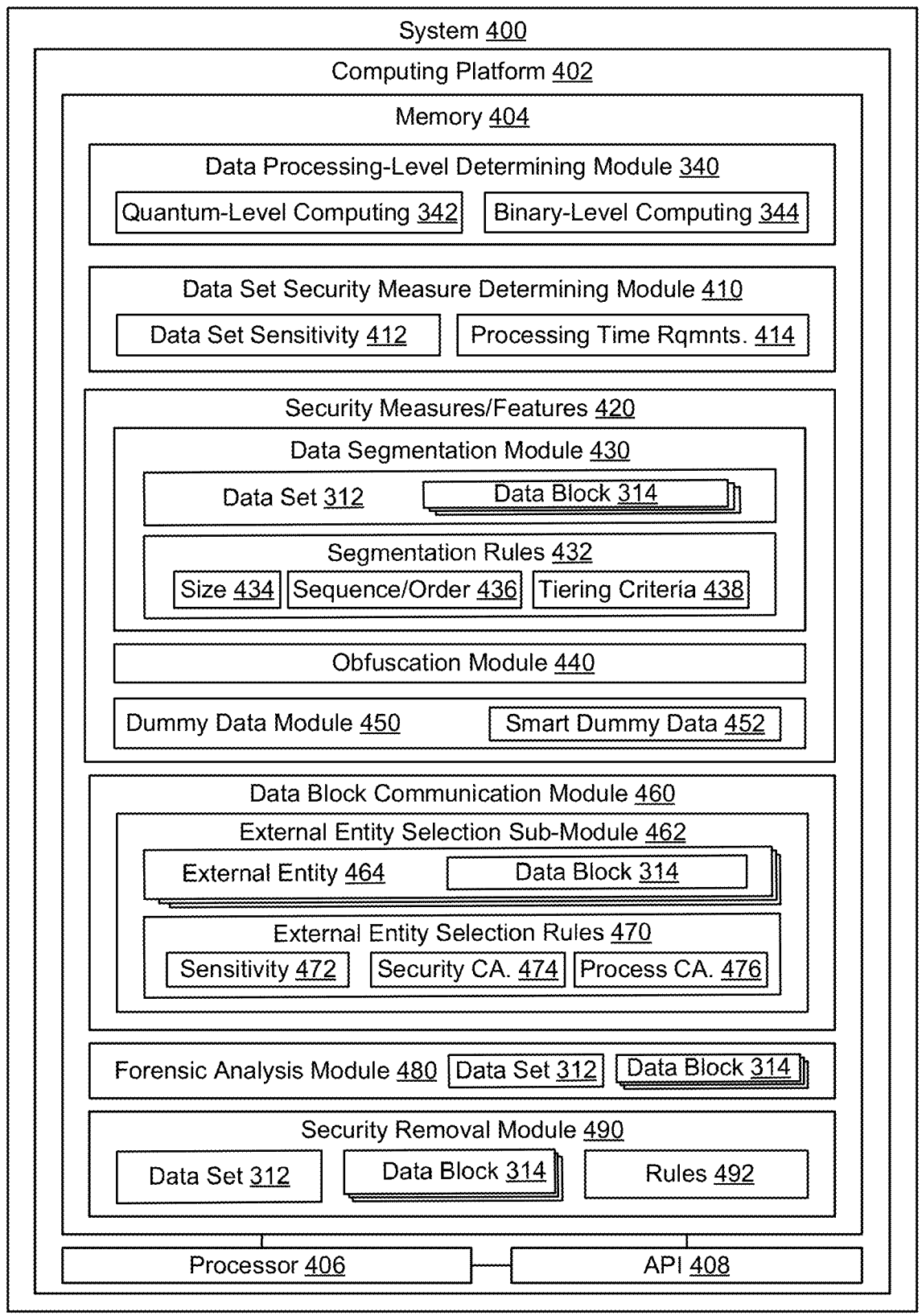
Figure 5:
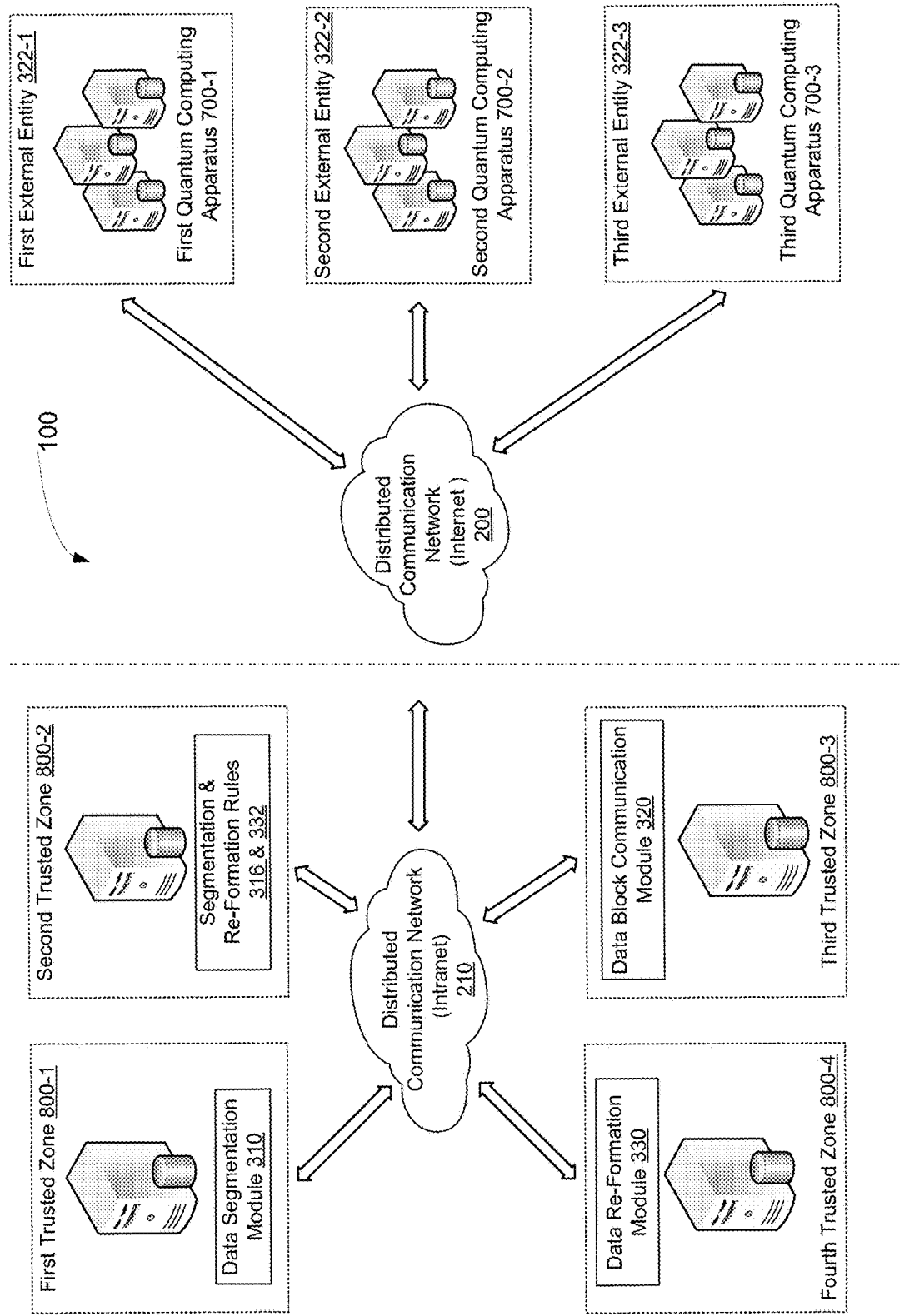
Figure 6:
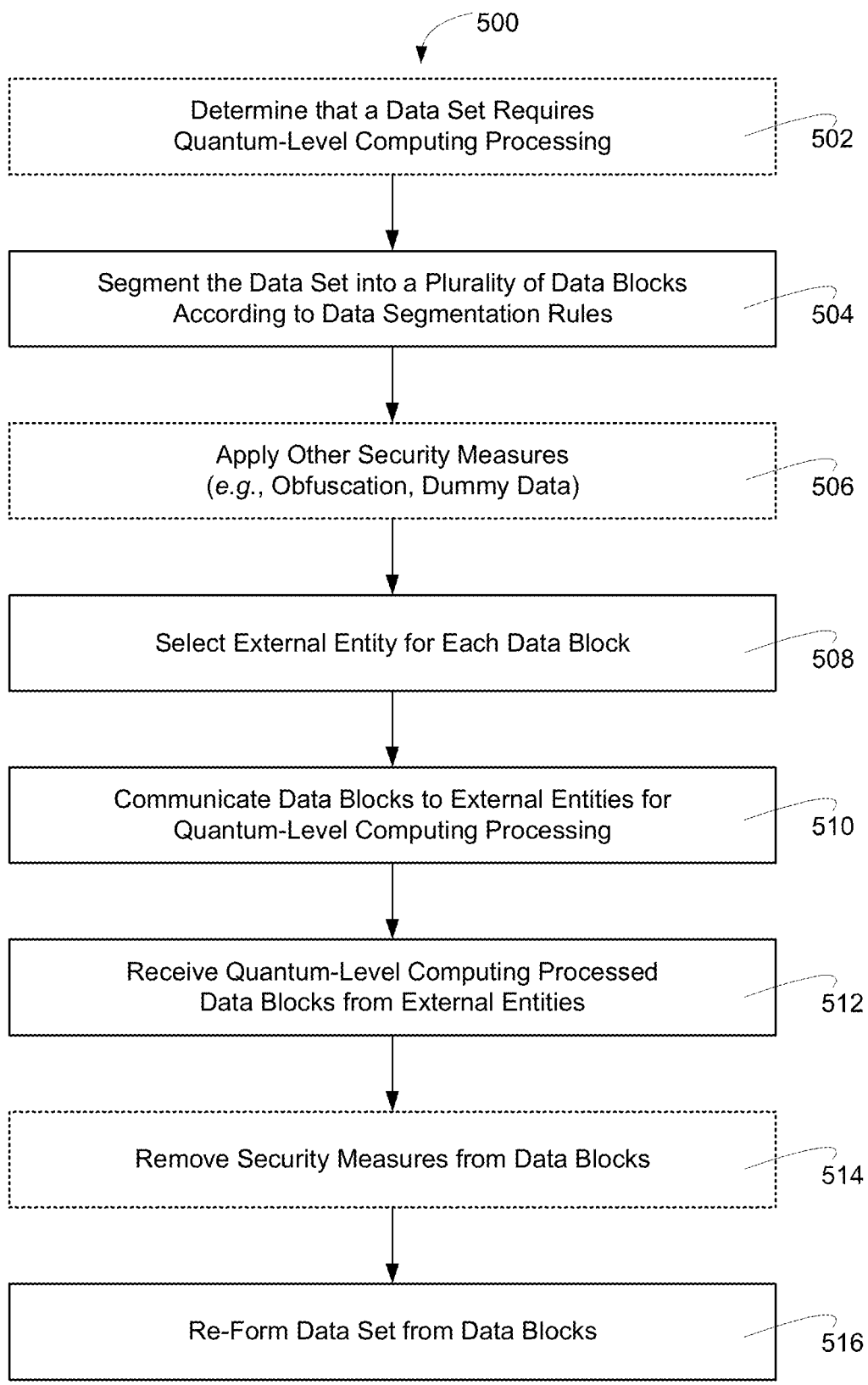
Figure 7:
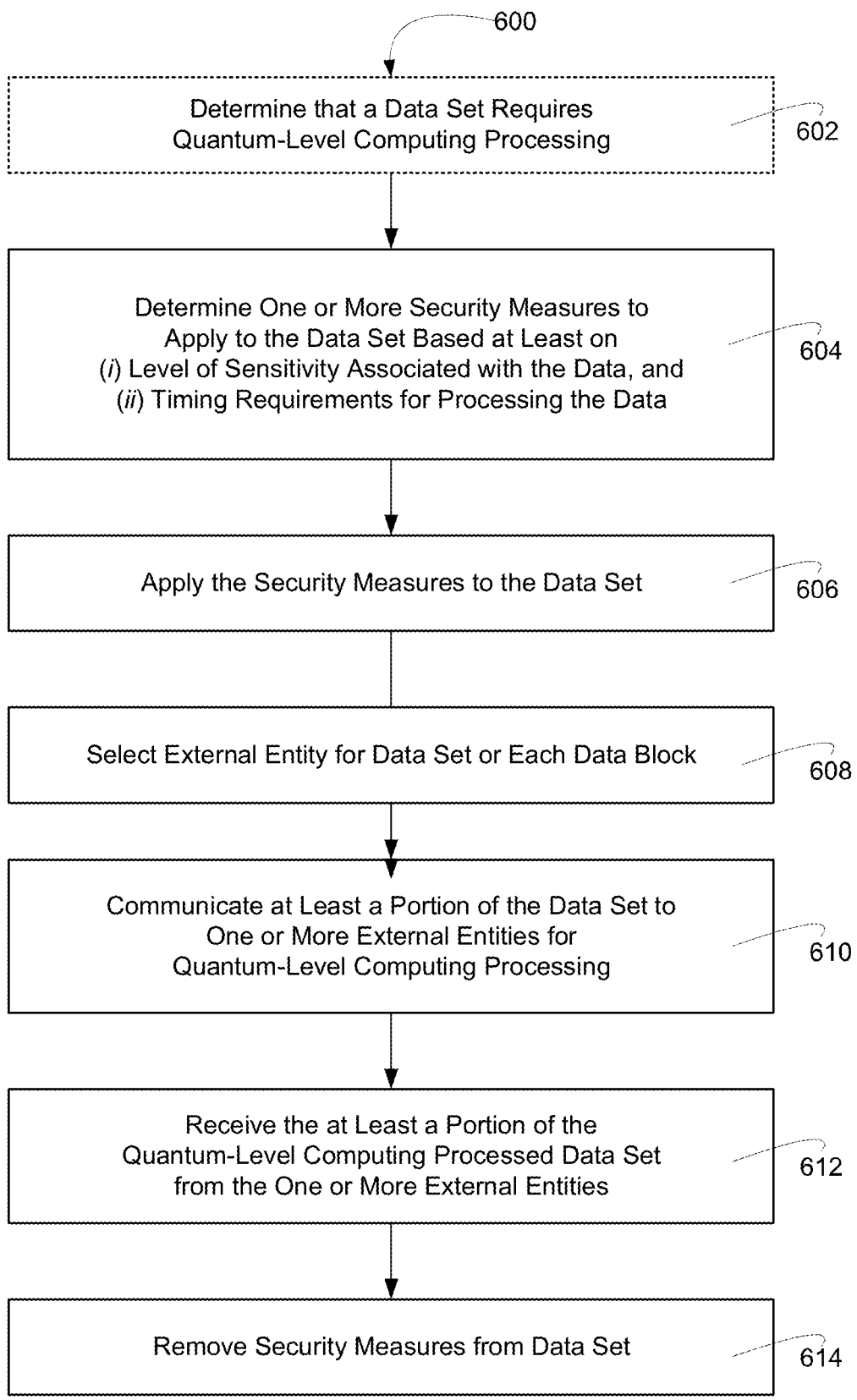

Having thus described embodiments of the invention in general terms, reference will now be made the accompanying drawings, wherein:

FIG. 1 provides a schematic diagram of an exemplary system for implementing security measures for data sets requiring external quantum-level computing processing, in accordance with embodiments of the present invention;

FIG. 2 provides a block diagram of a quantum optimizer apparatus, in accordance with embodiments of the present invention;

FIG. 3 provides a block diagram of a system for implementing data segmentation for data sets requiring external quantum-level computing processing, in accordance with embodiments of the present invention;

FIG. 4 provides a block diagram of a system for determining and implementing security measures for a data set requiring external quantum-level computing processing, in accordance with embodiments of the present invention;

FIG. 5 provides a schematic diagram of system for implementing data segmentation in a trusted zone environment, in accordance with embodiments of the present invention;

FIG. 6 provides a flow diagram of a method for implementing data segmentation for data sets requiring external quantum-level computing processing, in accordance with embodiments of the present invention; and FIG. 7 provides a flow diagram of a method for determining and implementing security features for a data set requiring external quantum-level computing processing, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, as described in more detail below, the present invention applies security measures to data sets requiring external/third-party quantum-level processing. By providing such security measures to the data sets prior to communicating/transferring the data to the external/third-party data processors, the present invention limits, if not eliminates, the risk associated with the data being breached/comprised, either intentionally or unintentionally, by the external/third-party entity.

In specific embodiments of the invention, the security measures that are applied to the data set are determined based on at least one of the sensitivity/confidentiality of the data set and the timing requirements for processing the data (e.g., whether the data set requires immediate/real-time processing or whether the data set can be processed in due course). The security measures may include, but are not limited to, (i) segmenting the data such that a different external entity is assigned to each segment, (ii) obfuscating the data set or data segment by rearranging the data elements, and (iii) inserting dummy data into the data set or data segment.

Accordingly, in specific embodiments of the invention, the data set may be segmented into discrete random or systematic (based on tiering criteria) data blocks with each individual data block being communicated/transferred to a different external/third-party entity for subsequent quantum-level data processing. As a result, none of the external/third-party entities have access to the entire data set and, as such, in the event that the data possessed by external/third-party entity is breached/comprised, the risk posed to the data owner is minimized.

In other embodiments of the invention, the data set and/or the data blocks are obfuscated, such that asymmetrical cryptography or the like is implemented to re-arrange/shift the data in the data set and/or data blocks prior to communicating/transferring the data sets/segments to the external/third-party entities for quantum-level processing. Once the data set/data blocks have been quantum-level processed and returned to the data owner, the obfuscation is removed from the data set/data block.

In still further embodiments of the invention, the data set and/or data blocks may be injected with "dummy" data (i.e., benign information that does not contain any useful data, but serves to reserve space where real data is nominally present). Insertion of dummy data further prevents breached data from being read/used by a wrongdoer. In specific embodiments of the invention the "dummy" data may be logically programmed (i.e., so-called smart "dummy" data) so that the data owner can discern whether the dummy data has been accessed, read or otherwise manipulated.

In additional embodiments of the invention, the various functions of the system are segregated in different trusted zones and, as such, processing occurs in a silo-like fashion without the processing module being cognizant of rules that are being applied and/or upstream and downstream processing parameters. For example, in specific embodiments of the invention, data set segmentation, data set re-formation, the rules associated with data segmentation and re-formation and, in some embodiments, the communication/transfer of data sets are segregated in separate trusted zones. Trusted zones allow for segmentation and reformation rules to be applied without the corresponding segmentation and reformation algorithm being aware of which segmentation/reformation rules are being applied. Additionally, in those embodiments in which the communication/transfer occurs within a separate trusted zone, the data segmentation and re-formation may occur absent knowledge as to which external/third-party entity processed a data block.

Referring to FIG. 1, a schematic diagram is provided of a system 100 for implementing data segmentation for a data sets requiring external/third-party entity quantum-level computing processing, in accordance with embodiments of the present invention. The system 100 is implemented in a distributed communication environment via computing network 200, which typically comprises the Internet and may include various sub-nets and/or intranets. System 100 include system 300 which may comprise one or more computing devices, System 300 includes a computing platform 302 having a memory 304 and one or more processors 306 in communication with the memory. The memory 304 stores data segmentation module 310 that is executable by processor(s) 306 and configured to receive a data set 312 that has been determined to require quantum-level processing and segment the data set 312 into a plurality of data blocks by applying segmentation rules.

The memory 304 additionally stores data block communication module 320 that is executable by the processor(s) 306 and configured to select, for each data block 312, an external entity 322-1, 322-2, 322-3 for quantum-level computing processing of the data block 312 and initiate communication, via distributed communication network 200, of the data blocks 312 to the corresponding selected external entity 322-1, 322-2, 322-3 or the like.

The external entities 322-1, 322-2, 322-3 include a quantum computing apparatus 700-1, 700-2, 700-3 or the like configured to provide quantum-level computing. As used herein, a quantum computing apparatus 700-1, 700-2, 700-3 or the like is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computing apparatus implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computing apparatus: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Quantum computing apparatus 700-1, 700-2, 700-3 and the like can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computing apparatus 700-1, 700-2, 700-3 as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computing apparatus in conjunction with a classical/binary computer. Such a configuration enables the present invention to take advantage of quantum speedup in solving optimization problems, while avoiding the drawbacks and difficulty of implementing quantum computing to perform non-optimization calculations. Examples of quantum computing apparatus 700-1, 700-2, 700-3 that can be used to solve optimization problems parallel to a classic system are described in, for example, U.S. Pat. Nos. 9,400,499, 9,207,672, each of which is incorporated herein by reference in its entirety.

FIG. 2 is a block diagram of an exemplary quantum optimizer 710 that can be used in parallel with a classical computer to solve optimization problems. The quantum Optimizer 710 is comprised of a data extraction subsystem 706, a quantum computing subsystem 702, and an action subsystem 704. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the data extraction subsystem 706 communicates with the network to extract data for optimization. It will be understood that any method of communication between the data extraction subsystem 706 and the network is sufficient, including but not limited to wired communication, Radiofrequency (RF) communication, BLUETOOTH®, WIFI®, and the like. The data extraction subsystem 706 then formats the data for optimization in the quantum computing subsystem 702.

As further depicted in FIG. 2, the quantum computing subsystem 702 comprises a quantum computing infrastructure 714, a quantum memory 712, and a quantum processor 710. The quantum computing infrastructure 702 comprises physical components for housing the quantum processor 710 and the quantum memory 712. The quantum computer infrastructure further comprises a cryogenic refrigeration system to keep the quantum computing subsystem 702 at the desired operating temperatures. In general, the quantum processor 710 is designed to perform adiabatic quantum computation and/or quantum annealing to optimize data received from the data extraction subsystem 706. The quantum memory 712 is comprised of a plurality of qubits used for storing data during operation of the quantum computing subsystem 704. In general, qubits are any two-state quantum mechanical system. It will be understood that the quantum memory 712 may be comprised of any such two-state quantum mechanical system, such as the polarization of a single photon, the spin of an electron, and the like.

The action subsystem 704 communicates the optimized data from the quantum computing subsystem 702 over the network. It will be understood that any method of communication between the data extraction subsystem 706 and the network is sufficient, including but not limited to wired communication, Radiofrequency (RF) communication, BLUETOOTH®, WIFI®, and the like.

Returning to FIG. 1, memory 304 of system 300 additionally stores data re-formation module 330 that is executable by the processor(s) 306 and configured to receive the data blocks 314 processed by the external entities 322-1, 322-2, 322-3 and the like implementing the quantum computing apparatus 700-1, 700-2, 700-3 and the like described above and combine the data blocks 314 to re-form the data set 312 by applying re-formation rules.

Referring to FIG. 3 a block diagram is presented of a system 300, which is configured for segmenting data sets into data blocks for subsequent external quantum-level computing processing, in accordance with embodiments of the present invention. In addition to providing greater detail, FIG. 3 highlights various alternate embodiments of the invention. The system 300 may include one or more of any type of computing device, such as one or more servers, personal computers or the like. The present systems and methods can accordingly be performed on any form of one or more computing devices.

The system 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, computing platform 302 also includes one or more processors 306, which may be an application-specific integrated circuit ("ASIC"), or other chipset, processor, logic circuit, or other data processing device. Processors 306 or other processor such as ASIC may execute an application programming interface ("API") 308 that interfaces with any resident programs, such as data processing-level determining module 340, data segmentation module 310, data block security module 350, data block communication module 320, data block forensic analysis module 380 and data set reformation module 330 and routines, sub-modules associated therewith or the like stored in the memory 304 of the system 300.

Processor 306 includes various processing subsystems (not shown in FIG. 3) embodied in hardware, firmware, software, and combinations thereof, that enable the functionality of system 300 and the operability of the system 300 on a network. For example, processing subsystems allow for initiating and maintaining communications and exchanging data with other networked devices, such as those quantum-level computing apparatus 700-1, 700-2, 700-3 shown in FIG. 1. For the disclosed aspects, processing subsystems of processor 306 may include any subsystem used in conjunction with data processing-level determining module 340, data segmentation module 310, data block security module 350, data block communication module 320, data block forensic analysis module 380 and data set reformation module 330 and related algorithms, sub-algorithms, modules, sub-modules thereof Computer platform 302 may additionally include communications module (not shown in FIG. 3) embodied in hardware, firmware, software, and combinations thereof, that enables communications among the various components of the system 300, as well as between the other networked devices. Thus, communication module may include the requisite hardware, firmware, software and/or combinations thereof for establishing and maintaining a network communication connection.

In specific embodiments of the system 300, the memory 304 stores data processing-level determining module 340 that is configured to determine the level of processing required of the data set. The level of processing may include, but is not limited to, quantum-level computing 342 and conventional binary-level computing 344. In specific embodiments of the invention, the determination of the level of processing may include a combination of quantum-level computing 342 and binary-level computing 344. In such embodiments of the invention, the data processing-level determining module 340 may determine which processing is to be performed by the quantum-level computing 342 and which processing is to be performed by conventional binary-level computing 344. The data processing-level determining module 340 is configured to determine the level of processing required based on the complexity of the computations, the accuracy required of the computations, processing time requirements and the like.

Further the memory 304 of system 300 stores data segmentation module 310 that is configured to receive a data set 312 that have been determined to require quantum-level computing processing and segment the data set 312 into a plurality of data blocks 314 by applying predetermined segmentation rules 316. The minimum quantity of data blocks 314 may be based on the quantity of external entities 322 that the data owner has engaged in quantum-level computing processing. Segmentation rules 316 may be defined that determine the size 317 of the data block 314 (e.g., defined by a unit of memory size or quantity of data elements) and or the sequence/order 318 of data blocks 314 and/or the tiering/slicing criteria 319 (discussed, infra.). The size of the data blocks may be uniform or variable. The size of variable sized data blocks 314 may be based on the quantum-level computing capabilities of the external entity that is selected or will be selected to process the data block. In other embodiments of the invention, the size of variable sized may be random subject to a minimum size requirement. The sequencing/order 318 of the data blocks provides for the data blocks to include a sequence/order identifier, which is needed to subsequently reform the data set 312.

In specific embodiments of the system, the data segmentation module 310 is configured to randomly determine (through application of "horizontal" analytics) which data from the data set 312 to include in the data blocks 316 (i.e., so-called "chopping" or "blocking" of the data set 312).

In other embodiments of the system, the data segmentation module 310 is configured to systematically determine (through application of "vertical" analytics which data from the data set in include in the data blocks 316. In such embodiments, predetermined rules 316 define criteria/requirements 319 as to which data from the data set 312 to include in the data blocks 316 (i.e., so-called "slicing" or "tiering" of the data set 312). The criteria 319 may be based on any classification or attribute associated with data elements in the data set 312. For example, in those embodiments in which the data set 312 includes data elements associated with individuals, attributes associated with the individuals, (e.g., age range, gender, region of physical location or the like) may be used to slice or tier the data set 312 into tiers/slices of data (collectively, referred to herein as data block 316). In such embodiments of the invention, each tier/slice of the data set 312 may be subsequently communicated to different external entities for quantum-level computing processing. It should be noted that multiple tiers of data may be employed in the segmentation of the data set 312. For example, the entire data set 312 may first be segmented into first tiers based on age groups of the individuals associated with data elements, and subsequently one or more of the first tier segments may be segmented into second tiers based on the gender of the individuals associated with the data elements and so on. In specific embodiments of the system each of the tiered segments may be designated for a specific one of the plurality of different external entities for subsequent quantum-level computing processing.

In other embodiments of the system, the data segmentation module 310 is configured to use both random chopping/blocking of the data set 312 and systematic slicing/tiering of the data set 312 to form the data blocks 316. In such embodiments of the system, random chopping/blocking of the data set 312 may occur first, followed by one or more instances of systematic slicing/tiering of the data set 312 based on predetermined tiering criteria. While in other embodiments of the system, the data set 312 may be systematically sliced/tiered first, followed by one or more instances of randomly chopping/blocking the data set 312. In this regard, random chopping/blocking of the data set 312 (i.e., horizontal analytics) and systematic slicing/tiering of the data set 312 (i.e., vertical analytics) may be applied to the data set in any order and/or in any number of instances.

Memory 304 of system 300 additionally includes data block security module 350 that is configured to provide additional security measures to data blocks 314 based on predetermined security rules 360. Security rules 360 may be based on the data sensitivity 362 (i.e., more sensitive data may provide for heightened security measures), timing requirements 364 for processing the data (i.e., immediate/real-time processing requirements may dictate less security measures, while processing with minimal or no time requirements may provide for more/full security measures) and external entity security capabilities 366 (i.e., less security capabilities at the external entity may dictate more/full security measures, while more security measures at the external entity may provide for less security measures).

The data block security module 350 may include obfuscation sub-module 352 that is configured to re-arrange or otherwise shift data elements within a data block 314. It should be noted that the obfuscation scheme applied to the data blocks 314 may vary by data block, such that one data block may be subject to a first obfuscation scheme, while a second data block may be subject to a second obfuscation scheme different than the first obfuscation scheme. For example, a first obfuscation scheme may provide for shifting certain data elements horizontally to the left by a certain number of columns, while a second obfuscation scheme may provide for shifting certain data elements vertically upward by a certain number of rows. Moreover, while examples herein provide for shifting of data elements, other obfuscation schemes may be implemented that rearrange data elements by other means.

In further embodiments of the system, data security module 350 may include dummy data sub-module 354 that is configured to insert "dummy" data in the data block. Dummy data as used herein is benign information that does not contain any useful data, but serves to reserve space where real data is nominally present. Dummy data serves to make the data block less comprehensible in the event that the data block is compromised (i.e., unauthorized access or use of the data). In specific embodiments of the invention the dummy data may be logically programmed (i.e., so-called smart "dummy" data 356) to record or otherwise detect accessing (or attempted accessing/reading) of the dummy data. In this regard, the owner of the data may be able to subsequently detect unauthorized accessing of the data block or an attempt to access the data at the external entity.

The memory 304 of system 300 additionally includes data block communication module 320 that is configured to select an external entity 322 for each of the plurality of data blocks 314 based on external entity selection rules 370 and initiate communication of the data block 314 to the selected external entity 322. Any one external entity may be selected to process one or more of the data blocks 314. The external entity selection rules 370 may be based on data sensitivity 372, security capabilities 374 of the external entity, processing capability 376 of the external entity, including processing turnaround times and the like.

Additionally, system 300 may store data block forensic analysis module 380 that is configured to forensically analyze data blocks 314 once the data blocks 314 have been quantum-level computing processed by the external entities 322 and communicated back to the system 300. Forensic analysis provides for analyzing the data block to determine if the data has been accessed, read or otherwise used in an unauthorized manner. In those embodiments of the invention, in which the data blocks 314 include smart "dummy" data 356, the forensic analysis may include obtaining recorded information associated with the smart "dummy" data 356 that indicated accessing or an attempted access of the dummy data.

Further, system 300 stores data re-formation module 300 that is configured to combine the data blocks 314 to re-form the data set in accordance with data re-formation rules 332. The data re-formation rules may be data block or data set specific and take into account the type of data segmentation implemented by the data segmentation module 310 and the security measures applied by the data block security module 350. In this regard, the data reformation module 300 may be configured to remove security measures from the data blocks 314 (or in some embodiments, after the data set 312 has been re-formed), such as, but not limited to, removing previously applied obfuscation and/or dummy data.

Referring to FIG. 4 a block diagram is presented of a system 400, which is configured for determining security measures for a data set determined to require external quantum-level computing processing, in accordance with embodiments of the present invention. In addition to providing greater detail, FIG. 4 highlights various alternate embodiments of the invention. The system 400 may include one or more of any type of computing device, such as one or more servers, personal computers or the like. The present systems and methods can accordingly be performed on any form of one or more computing devices.

The system 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes one or more processors 406, which may be an application-specific integrated circuit ("ASIC"), or other chipset, processor, logic circuit, or other data processing device. Processors 406 or other processor such as ASIC may execute an application programming interface ("API") 408 that interfaces with any resident programs, such as data and routines, sub-modules associated therewith or the like stored in the memory 404 of the system 400.

Processor 406 includes various processing subsystems (not shown in FIG. 3) embodied in hardware, firmware, software, and combinations thereof, that enable the functionality of system 400 and the operability of the system 400 on a network. For example, processing subsystems allow for initiating and maintaining communications and exchanging data with other networked devices, such as those quantum-level computing apparatus 700-1, 700-2, 700-3 shown in FIG. 1. For the disclosed aspects, processing subsystems of processor 406 may include any subsystem used in conjunction with data processing-level determining module 340 data set security measure determining module 410, data segmentation module 430, obfuscation module 440, dummy data module 450, data block communication module 460, forensic analysis module 480 and security measure removal module 490 and related algorithms, sub-algorithms, modules, sub-modules thereof.

Computer platform 402 may additionally include communications module (not shown in FIG. 4) embodied in hardware, firmware, software, and combinations thereof, that enables communications among the various components of the system 400, as well as between the other networked devices. Thus, communication module may include the requisite hardware, firmware, software and/or combinations thereof for establishing and maintaining a network communication connection.

In specific embodiments of the system 400, the memory 404 stores data processing-level determining module 340 that is configured to determine the level of processing required of the data set. The level of processing may include, but is not limited to, quantum-level computing 342 and conventional binary-level computing 344. In specific embodiments of the invention, the determination of the level of processing may include a combination of quantum-level computing 342 and binary-level computing 344. In such embodiments of the invention, the data processing-level determining module 340 may determine which processing is to be performed by the quantum-level computing 342 and which processing is to be performed by conventional binary-level computing 344. The data processing-level determining module 340 is configured to determine the level of processing required based on the complexity of the computations, the accuracy required of the computations, processing time requirements and the like.

Further the memory 404 of system 400 stores data set security measure determining module 410 that is configured to determining which security measures 420 should be applied to a data set requiring external entity quantum-level computing processing. The determination as to which security measures should be applied may be based on the sensitivity 412 of the data in the data set 312 (i.e., more sensitive data may provide for more/full security measures, while less sensitive data may provide for less security measures or less complex/intrusive security measures), the processing time requirements of the data set (i.e., immediate/real-time processing may provide for less security measures or less complex/intrusive security measures, while processing with minimal or no processing time requirements may provide for more/full security measures). The security measures 420 that may be determined and applied may include, but are not limited to, data segmentation, data obfuscation, insertion of "dummy" data and the like.

As such, system 400 stores data segmentation module 430 that is configured to receive a data set 312 that have been determined to require quantum-level computing processing and segment the data set 312 into a plurality of data blocks 314 by applying predetermined segmentation rules 432. The minimum quantity of data blocks 314 may be based on the quantity of external entities 322 that the data owner has engaged in quantum-level computing processing. Segmentation rules 432 may be defined that determine the size 434 of the data block 314 (e.g., defined by a unit of memory size or quantity of data elements) and or the sequence/order 436 of data blocks 314 and/or the tiering/slicing criteria 438. The size of the data blocks may be uniform or variable. The size of variable sized data blocks 314 may be based on the quantum-level computing capabilities of the external entity that is selected or will be selected to process the data block. In other embodiments of the invention, the size of variable sized may be random subject to a minimum size requirement. The sequencing/order 436 of the data blocks provides for the data blocks to include a sequence/order identifier, which is needed to subsequently reform the data set 312.

As previously noted, in specific embodiments of the system, the data segmentation module 430 may be configured to randomly determine (through application of "horizontal" analytics) which data from the data set 312 to include in the data blocks 316 (i.e., so-called "chopping" or "blocking" of the data set 312) and/or systematically determine (through application of "vertical" analytics which data from the data set in include in the data blocks 316. In such embodiments, predetermined rules 316 may define criteria/requirements 438 as to which data from the data set 312 to include in the data blocks 316 (i.e., so-called "slicing" or "tiering" of the data set 312). The tiering criteria 438 may be based on any classification or attribute associated with data elements in the data set 312. In such embodiments of the invention, each random block of the data set 312 and/or tier/slice of the data set 312 (each collectively referred to herein as data block 316) may be subsequently communicated to different external entities for quantum-level computing processing. It should be noted that multiple tiers of data may be employed in the segmentation of the data set 312 and/or combinations of random chopping/blocking of the data set 312 and systematic slicing/tiering of the data set 312 may be used in unison to form the data blocks 316. In such embodiments, random chopping/blocking of the data set 312 (i.e., horizontal analytics) and systematic slicing/tiering of the data set 312 (i.e., vertical analytics) may be applied to the data set in any order and/or in any number of instances.

Security measures/features 420 additionally includes obfuscation module 440 that is configured to re-arrange or otherwise shift data elements within the data set 312 or data block 314. It should be noted that the obfuscation scheme applied to the data set 312 or data blocks 314 may vary by within the data 312 or by data block 314, such that one section of a data set 312 or a data block 314 may be subject to a first obfuscation scheme, while a second section of the data set 312 or second data block 314 may be subject to a second obfuscation scheme different than the first obfuscation scheme. For example, a first obfuscation scheme may provide for shifting certain data elements horizontally to the left by a certain number of columns, while a second obfuscation scheme may provide for shifting certain data elements vertically upward by a certain number of rows. Moreover, while examples herein provide for shifting of data elements, other obfuscation schemes may be implemented that rearrange data elements by other means.

In further embodiments of the system 400, security measures/features 420 may include dummy data module 450 that is configured to insert "dummy" data in the data set 312 or data block 314. In specific embodiments of the invention the dummy data may be logically programmed (i.e., so-called smart "dummy" data 356) to record or otherwise detect accessing (or attempted accessing/reading) of the dummy data. In this regard, the owner of the data may be able to subsequently detect unauthorized accessing of the data block or an attempt to access the data at the external entity.

The memory 404 of system 400 additionally includes data block communication module 320 that is configured to select an external entity 464 for the data set 312 or for each of the plurality of data blocks 314 based on external entity selection rules 370 and initiate communication of the data block 314 to the selected external entity 464. In those embodiments in which the data set 312 is not subjected to segmentation, a single external entity 464 is selected for quantum-level processing of the entire data set 312. In those embodiments in which the data set is subjected to data segmentation, each of the data blocks 314 are assigned to one of the plurality of external entities 464, such that the entire data 312 is not processed by a single external entity 464. In this regard, any one external entity may be selected to process one or more of the data blocks 314. The external entity selection rules 470 may be based on data sensitivity 472, security capabilities 474 of the external entity, processing capability 476 of the external entity, including processing turnaround times and the like.

Additionally, system 400 may store data block forensic analysis module 480 that is configured to forensically analyze the data set 312 or data blocks 314 once the data set 312 or data blocks 314 have been quantum-level computing processed by the external entities 322 and communicated back to the system 400. Forensic analysis provides for analyzing the data set 312 or data block 314 to determine if the data has been accessed, read or otherwise used in an unauthorized manner. In those embodiments of the invention, in which the data set 312 or data blocks 314 include smart "dummy" data 452, the forensic analysis may include obtaining recorded information associated with the smart "dummy" data 452 that indicated accessing or an attempted access of the dummy data.

Further, system 300 stores security removal module 490 that is configured to remove or reverse the previously applied security measures from the data set 312 or data blocks 314 based on security removal rules 492. In specific embodiments of the invention, in which the data set 312 was previously segmented into data blocks 314, the security removal module 490 is configured to combine the data blocks 314 to re-form the data set 312 in accordance with data re-formation rules 332. In other embodiments of the invention, in which obfuscation or dummy data was previously applied to the data set 312 or data blocks 314, the security removal module 490 is configured to remove previously applied obfuscation and/or dummy data. The data re-formation rules may be data block or data set specific and take into account the type of data segmentation implemented by the data segmentation module 310 and the security measures 420 applied.

Referring to FIG. 5 a schematic diagram is provided of system 100 in which the various functions and modules of the system 100 are segregated in separate trust zones, in accordance with embodiments of the present invention. Specifically, data segmentation module 310 is disposed in a first trusted zone 800-1, segmentation and reformation rules 316 and 322 are disposed in a second trusted zone 800-2, data block communication module 320 is disposed in a third trusted zone 800-3 and data re-formation module 330 is disposed in fourth trusted zone 800-4. While FIG. 5 depicts the trusted zones 800-1, 800-2, 800-3 and 800-4 as being embodied in separate apparatus/devices and in communication via distributed communication network 210, such as an intranet or the like, in other embodiments of the invention two or more of the trusted zones 800-1, 800-2, 800-3 and 800-4 may be embodied in the same physical apparatus/device.

A trusted zone, otherwise referred to as a security zone are logical entities to which one or more interfaces are bound and serve as the building block for apply policies. Trusted zones provide a means to distinguish groups of hosts (servers or the likes) and their resources from one another in order to apply different security policies/measures to the hosts and their resources. In this regard, trusted zones have active security policies that enforce rules for the transit traffic, in terms of what traffic can be communicated through the firewall and the actions needed to take place when the traffic is communicated through the firewall. Further, trusted zones employ screens that allow or deny all connection attempts that require passage from one trusted zone to another. Thus, for every trusted zone, a predefined set of screen options can be set to detect and block various kinds of communication that the device determines to be potentially harmful. In addition, trusted zones include IP address books to identify members so that security policies can be applied to the trusted zone.

In accordance with embodiments of the present invention trusted zones allow for the data segmentation module 310 and the data reformation module 330 to access and implement the segmentation rules 316 and re-formation rules 332 absent knowledge as to which segmentation rules 316 or re-formation rules 332 are being applied to a give segmentation or re-formation instance. As a result a further layer of security is realized, in that, a user gaining access to the data segmentation module 310 via the first trusted zone 800-1 or the data re-formation module 330 via the fourth trusted zone 800-4 is unable to recreate the data segmentation scheme or the data re-formation scheme since the rules applied to segmentation and reformation are disposed in a separate trusted zone 800-2.

In addition, in those embodiments of the invention in which the data clock communication module 320 is disposed in a separate trusted zone, such as third trusted zone 800-3, segmentation and re-formation may be performed absent knowledge of which external entity performed the quantum-level processing on the associated data block(s).

Referring to FIG. 6 a flow diagram is depicted of a method 500 for segmenting data sets for subsequent external entity quantum-level computing, in accordance with embodiments of the present invention. At Event 502, a data set is determined to require quantum-level computing processing, in addition to or in lieu of conventional binary-level computing processing. The determination may be based on the complexity of the computation required, the accuracy required of the computation and/or the time allotted for completing the processing and/or other factors.

At Event 504, the data set determined to require quantum-level computing processing is segmented into a plurality of data blocks according to data segmentation rules. The data blocks may be generated to include random data elements (so-called horizontal analytics) and/or the data blocks may be generated through a systematic tiering/slicing of data approach (so-called vertical analytics) to include data elements that meet predetermined criteria associated with the data elements. The data segmentation rules may define the size, in terms of memory storage or data elements, of the data blocks, which may be uniform or variable and/or the sequencing/order of the data blocks and/or the tiering/slicing criteria At Event 506, other security measures/features may be applied to the data blocks bases on security measure rules. The other security measures may include, but are not limited to, obfuscation (i.e., rearranging or shifting of data elements within the data block) or insertion of dummy data or the like. The security measure rules may be based on the sensitivity of the data, the timing requirements for processing the data, the security capabilities of the external entities and the like.

At Event 508, which may occur after of before determining and implanting other security measures/features, external entities are selected for quantum-level processing of the data blocks. The selection of the external entities may be based on an external entity selection rules that take into account the sensitivity of the data, the security capabilities of the external entities and the processing capabilities of the external entities. At Event 510, the data blocks are communicated to the selected external entities.

At Event 512, in response to quantum-level computing processing of the data blocks by the external entities, the processed data blocks are received and, at Event 514, the other security measures are removed from the data blocks.

For example, the obfuscation is removed and the dummy data is removed from the data blocks. At Event 514, the data set is re-formed by combining the data blocks in accordance with re-formation rules.

Referring to FIG. 7 a flow diagram is depicted of a method 600 for determining and applying security measures to data sets for subsequent external entity quantum-level computing, in accordance with embodiments of the present invention. At Event 602, a data set is determined to require quantum-level computing processing, in addition to or in lieu of conventional binary-level computing processing. The determination may be based on the complexity of the computation required, the accuracy required of the computation and/or the time allotted for completing the processing and/or other factors.

At Event 604, security measures to be applied to the data set are determined based on at least one of the level of sensitivity of the data and timing requirements for processing the data. The security measures may include, but are not limited to, segmenting the data into data blocks, obfuscating the data set or data blocks and inserting dummy data into the data set or data blocks. At Event 606, the determined security measures are applied to the data set.

At Event 608, which may occur after of before determining and implanting other security measures/features, an external entity is selected for the data set or external entities are selected for the data blocks. The selection of the external entities may be based on an external entity selection rules that take into account the sensitivity of the data, the security capabilities of the external entities and the processing capabilities of the external entities. At Event 610, the data set or data blocks are communicated to the selected external entity/entities.

At Event 612, in response to quantum-level computing processing of the data set or data blocks by the external entities, the processed data set or data blocks are received and, at Event 614, the security measures are removed from the data blocks. For example, the data set is re-formed by combining the data blocks in accordance with re-formation rules, the obfuscation is removed from the data set or data blocks and/or the dummy data is removed from the data set or blocks.

Thus, systems, apparatus, methods, and computer program products described above provide for determining and applying security measures, such as segmentation, obfuscation and/or insertion of dummy data, to data sets determined to require external quantum-level computing processing. The security measures herein described and implemented lessens the risk associated with the data being breached/comprised at the external entity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining security measures for data sets determined to require quantum-level computing, the system comprising:
   a distributed computing network configured to communicate data amongst a plurality of computing devices;
   one or more external entities, each entity controlling one or more of the plurality of computing devices configured for quantum level-computing processing;
   a computer platform including a memory and one or more processors in communication with the memory;
   a data processing level determining module stored in the memory, executable by the one or more processors and configured to receive a plurality of data sets and determine whether each of the data sets require quantum-level computing processing or binary-level computing processing based on a complexity of computations required for processing the data set, an accuracy of the computations required of the data set and processing time requirements for the data set;
   a data set security measure determining module stored in the memory, executable by the one or more processors and configured to receive one or more data sets determined to require quantum-level computing processing and determine one or more security measures to apply to each of the data sets determined to require quantum-level computing processing based at least on a level of confidentiality associated with data in each of the data sets and timing requirements associated with processing each of the data sets;
   a plurality of security measure modules stored in the memory, executable by the one or more processors and configured to apply security measures to each of the data sets determined to require quantum-level computing as determined by the data set security measure determining module;
   a data communication module stored in the memory executable by the processor and configured to initiate communication of at least a portion of each of the data sets determined to require quantum-level computing to one or more external quantum-level processing entities, wherein the external entities are configured to process the data set via the corresponding one or more of the computing devices configured for quantum-level computing processing; and
   a security measure removal module stored in the memory, executable by the one or more processors and configured to, in response to receiving the quantum-level processed data from the one or more external quantum-level processing entities, remove the one or more security measures from each of the data sets.

2. The system of claim 1, wherein the data communication module further comprises an external entity selection sub-module configured to select one of the external entities for quantum-level computing processing of the data set based on predetermined external entity selection rules, wherein the predetermined external entity selection rules are based on one or more of type of data in the data block, external entity quantum-level computing processing capabilities and external entity security capabilities.

3. The system of claim 1, wherein the plurality of security measure modules include a data segmentation module configured to segment each of the data sets into a plurality of data blocks based on predetermined data segmentation rules.

4. The system of claim 3, wherein the data segmentation module is further configured to segment each of the data sets into the plurality of data blocks by at least one of (i) randomly determining which data elements to include in the data blocks, and (ii) systematically determining which data elements to include in the data blocks based on predetermined tiering criteria.

5. The system of claim 3, wherein the data segmentation rules are further configured to determine at least one of a size of each data block, a sequence for the plurality of data blocks and tiering criteria.

6. The system of claim 3, wherein the data communication module further comprises an external entity selection submodule configured to select, for each data block, one of the external entities for quantum-level computing processing.

7. The system of claim 3, wherein the security measure removal module is further configured to receive the quantum-level computing processed data blocks from the different external entities and combine the quantum-level computing processed data blocks to re-form a corresponding data set be applying re-formation rules.

8. The system of claim 7, wherein the data segmentation rules and data re-formation rules are stored in a first trusted computing zone, the data segmentation module is stored in a second trusted computing zone and the security measure removal module is stored in a third trusted computing zone.

9. The system of claim 1, wherein the plurality of security measure modules include a data obfuscation module configured to perform at least one of rearranging or shifting data elements in at least one of the data sets.

10. The system of claim 1, wherein the plurality of security measure modules include a dummy data module configured to generate dummy data and insert the dummy data into at least one the data sets.

11. The system of claim 10, wherein the dummy data module is further configured to generate the dummy data as logically programmed to record information associated with accessing the dummy data or attempting to access the dummy data.

12. The system of claim 1, further comprising a forensic analysis module stored in the memory, executable by the processor and configured to analyze the received quantum-level computing processed data blocks to determine whether the data blocks have been accessed or read in an unauthorized manner.

13. A method for external processing of a data sets determined to require quantum-level computing, the system comprising:
 receiving, by a computing device processor, a plurality of data sets;
 determine, by a computing device processor, whether each of the data sets require quantum-level computing processing or binary-level computing processing based on a complexity of computations required for processing the data set, an accuracy of the computations required of the data set and processing time requirements for the data set;
 determining, by a computing device processor, one or more security measures to apply to each of the data sets determined to require quantum-level computing processing based at least on (i) a level of confidentiality associated with data in the data set and timing requirements associated with processing each of the data sets;
 applying, by a computing device processor, the one or more security measures to each of the data sets determined to require quantum-level computing processing;
 in response to applying the one or more security measures to each of the data sets determined to require quantum-level computing processing, electronically communicating at least a portion of each of the data sets determined to require quantum-level computing processing to one or more external quantum-level processing entities; and
 in response to receiving the quantum-level processed data from the one or more external quantum-level processing entities, removing, by a computing device processor, the one or more security measures from each of the data sets.

14. The method of claim 13, wherein determining one or more security measures further comprises determining a segmentation scheme for segmenting each of the data sets into a plurality of data blocks, wherein the segmentation scheme comprises size of data blocks and sequencing of data blocks.

15. The method of claim 14, further comprising determining, by a computing device processor, an external entity that is capable of quantum-level computing processing for each of the data blocks, wherein the determination is based at least one or more of type of data in the data block, external entity quantum-level computing processing capabilities and external entity security capabilities.

16. The method of claim 13, wherein determining one or more security measures further comprises determining, based on obfuscation rules, an obfuscation scheme for rearranging the data in at least one the data sets.

17. The method of claim 13, wherein determining one or more security measures further comprises determining a dummy data insertion scheme for inserting dummy data into at least one the data sets.

18. A computer program product comprising:
 a non-transitory computer-readable medium comprising:
 a first set of codes for causing a computer to receive a plurality of data sets;
 a second set of codes for causing a computer to determine whether each of the data sets require quantum-level computing processing or binary-level computing processing based on a complexity of computations required for processing the data set, an accuracy of the computations required of the data set and processing time requirements for the data set;
 a third set of codes for causing a computer to determine one or more security measures to apply to each of the data sets determined to require quantum-level computing processing based at least on a level of confidentiality associated with data in the data set and timing requirements associated with processing each of the data sets;
 a fourth set of codes for causing a computer to apply the one or more security measures to each of the data sets determined to require quantum-level computing processing;
 a fifth set of codes for causing a computer to, in response to applying the one or more security measures to each of the data sets determined to require quantum-level computing processing, electronically communicate at least a portion of each of teach of the data sets determined to require quantum-level computing processing to one or more external quantum-level processing entities; and
 a sixth set of codes for causing a computer to, in response to receiving the quantum-level processed data from the one or more external quantum-level processing entities, remove the one or more security measures from each of the data sets.

19. The computer program product of claim 18, wherein the second set of codes is further configured to cause the computer to determine the one or more security measures, wherein the one or more security measures include (i) segmenting the each of the data sets determined to require quantum-level computing processing into data blocks, (ii) obfuscating the data to rearrange or shift data elements within a data set determined to require quantum-level computing processing or the data blocks, and (iii) generating and inserting dummy data within a data set determined to require quantum-level computing processing or the data blocks.

* * * * *